May 12, 1936.  G. KUHN  2,040,613
LIGHT PROJECTOR
Filed March 3, 1934   3 Sheets-Sheet 1
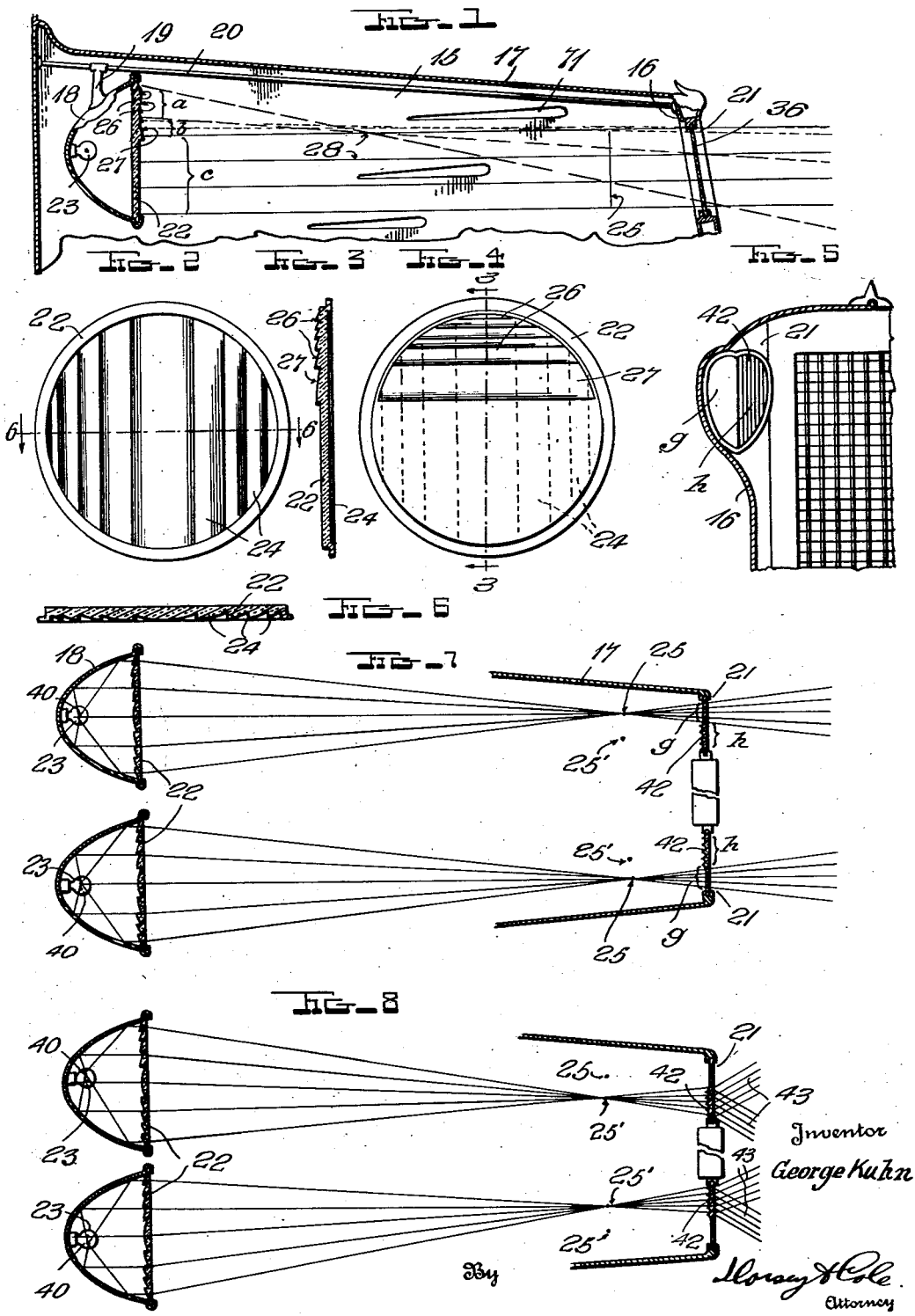

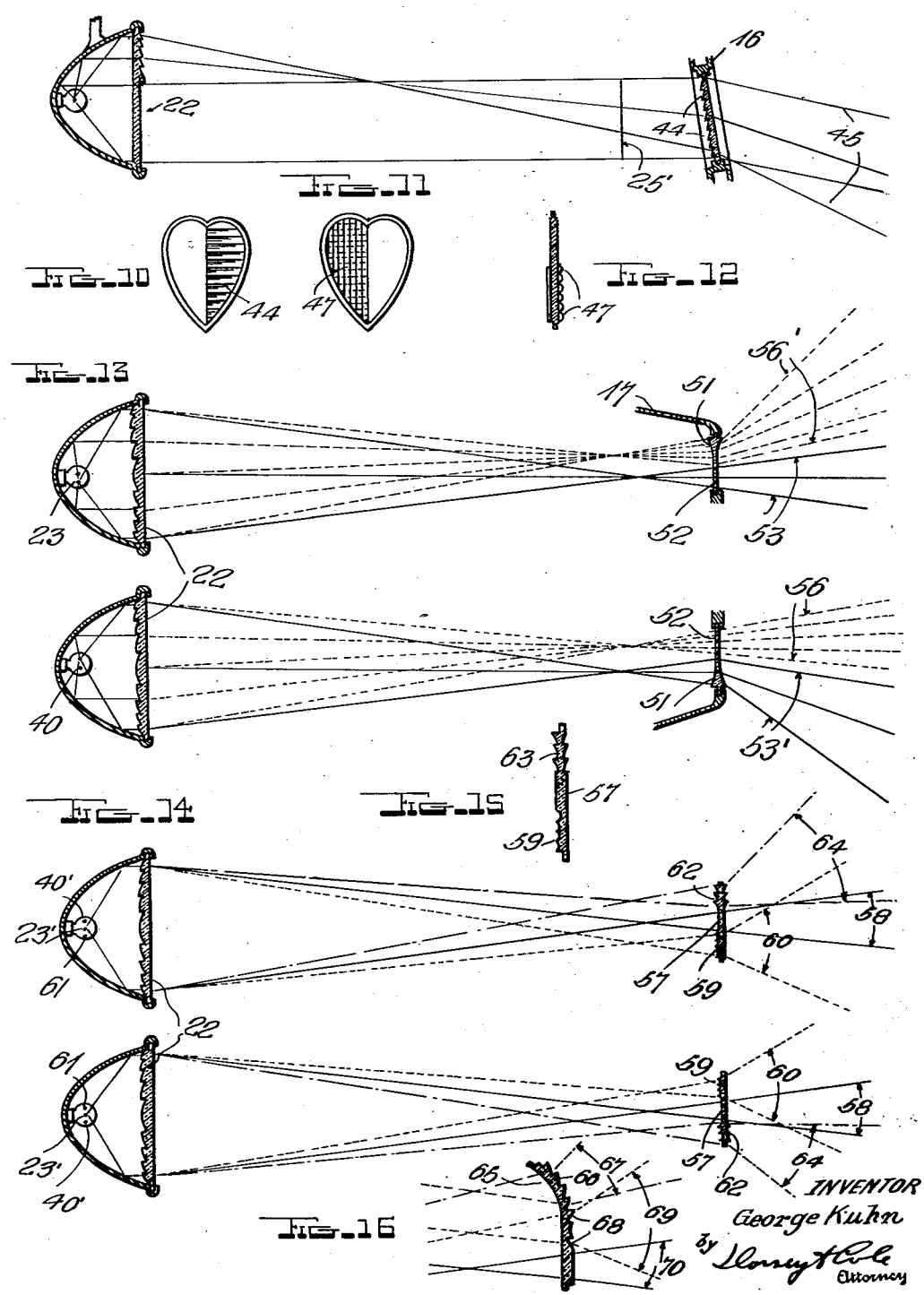

May 12, 1936.  G. KUHN  2,040,613
LIGHT PROJECTOR
Filed March 3, 1934   3 Sheets-Sheet 3
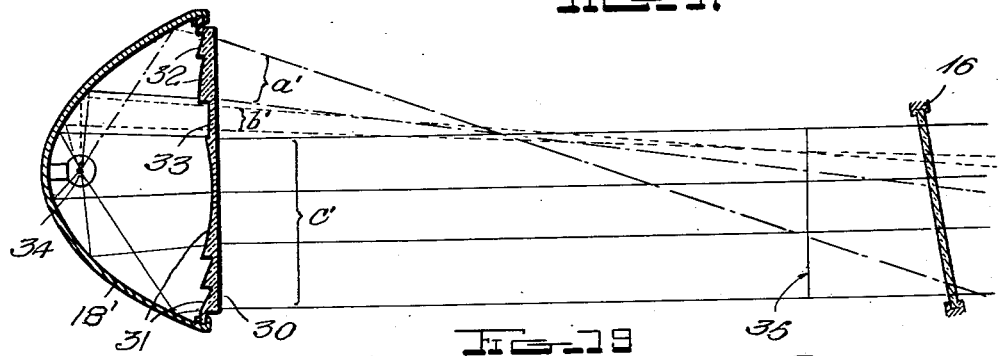
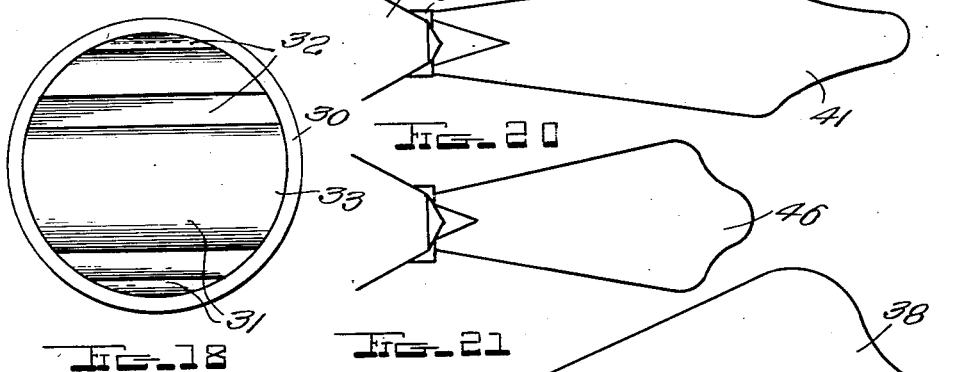
Inventor
George Kuhn,
by Lloyd H. Cole
Attorney Patented May 12, 1936

2,040,613

UNITED STATES PATENT OFFICE 2,040,613

LIGHT PROJECTOR

George Kuhn, Takoma Park, Md.

Application March 3, 1934, Serial No. 713,915

7 Claims. (Cl. 240—8.11)

This invention relates to light projectors such as driving lights for automobiles and the like.

One of the objects of the invention is to provide a driving light for vehicles which will be without glaring effect.

Another object of the invention is to provide a driving light in which the light projecting element comprising the complementary reflector and lens are shielded from any normal point of view forwardly or to the sides of the vehicle and outside of the projected beam.

A further object of the invention is to provide a non-glaring and shielded driving light in combination with a lens structure at the restricted opening through which the beam from the light projector passes, the combination operating to properly control the beam to effect various shapes and directions of the latter.

A further object is to provide a non-glaring and shielded light projector, having a plurality of light sources, in combination with a lenticular covering for the restricted opening having optical elements such that beams of different characteristics may be obtained upon the use of one light source or the other.

Still another object of the invention is to provide in a driving light having the characteristics above referred to, a complementary reflector and lens structure provided with a plurality of light sources, such that a substantially vertical locus of the crossing of the rays is obtained, which locus may be shifted horizontally.

Still another object is to provide a driving light construction having a shiftable locus for the rays in combination with a lens structure at the restricted opening through which the beam projects, such that by projecting the beam through one portion or another of the lens, the characteristics of the beam may be changed or modified, whereby a strong substantially horizontal beam for ordinary driving purposes may be obtained, and a lower or spread beam, or a beam which may be used in passing other vehicles, or in turning corners, may be obtained.

The invention contemplates the use of a restricted light-emitting opening, which, in the case of an automotive vehicle, is preferably arranged at the front end of the vehicle body, and which may be located in the hood or radiator or radiator shell, or other convenient portion of the shell of the vehicle. While the invention contemplates the use of a restricted light opening, no diminution in size of the light projecting elements is necessitated. On the contrary, a full sized reflector and lens are utilized, these elements being complementary to project a beam converged to pass through the restricted light opening.

In order to aid in the production of a non-glare effect, the reflector and lens are shielded from any normal point of view forwardly thereof, and outside of the projected beam, the shielding means in the case of an automotive vehicle being ordinarily the front body parts such as the hood, radiator, etc. Thus the shell of the body of the vehicle itself, may be said to be utilized as the housing for the illuminating means.

In the ordinary automobile, the front body element or radiator is ordinarily designed with as small frontal areas as possible, in order to reduce wind-resistance, and according to the present invention, the light-emitting opening or openings may be arranged in a radiator shell with little, if any enlargement of the frontal area of the latter.

Inasmuch as the light-emitting opening may be very narrow, so as to be hardly more than a slit, the light projector may be adjustably adapted for use in vehicles such as armoured tanks, the light openings being formed in the armoured walls of the latter, and the projecting apparatus being disposed within such walls so as to be practically inaccessible to projectiles.

Preferably, the reflector and lens are complementary to project a beam comprising at its point of issuance, upper and lower portions which converge laterally to cross in a substantially vertical line, referred to as the vertical locus, just behind the light-emitting opening. The rays of the lower portion of the beam are disposed in substantially parallel horizontal planes, and the light opening is of a height substantially equal to the vertical dimension of the lower portion of the beam so that the latter is passed in full through the opening. The upper portion of the beam is directed downwardly to merge with the lower beam portion and pass through the light-emitting opening in full. The lower beam portion thus provides for distant illumination of the roadway, and the downwardly projected beam portion provides for close-up illumination. Due to the restricted height of the light opening, the top portions of the reflector and lens are concealed, so as not to be visible from any normal point of view in the path of the beam.

The invention contemplates the use of a lenticular screen or closure plate at the light-emitting opening, operating in conjunction with a construction and arrangement of parts in the light projector whereby the vertical locus may be shifted laterally so that the beam will be projected to one portion or another of the closure plate, and will, through the action of lenticular elements on the closure plate be formed into beams suitable for various purposes, such as ordinary driving, passing other vehicles, turning corners, etc.

For the purpose of illustration of my invention, I have shown the same in connection with an automotive vehicle, although it will be understood that the use to which the invention may be put, is not to be restricted, it being contemplated that it will be of use in various illuminating fields, such as the flood-lighting of athletic or other fields, the illumination of building facades, stage illumination, etc.

In the drawings, in which I have illustrated the use of the invention in connection with automotive vehicles,—

Figure 1 represents a vertical sectional view through the forward end of a vehicle body on a plane containing the axis of the projector.

Figure 2 represents a front elevational view of the form of lens shown in Figure 1.

Figure 3 represents a vertical sectional view through the lens, on the line 3—3 of Figure 4.

Figure 4 represents a rear elevational view of the lens.

Figure 5 represents a fragmentary transverse sectional view through the forward end of the vehicle body looking forwardly.

Figure 6 represents a horizontal sectional view through the lens, on the line 6—6 of Figure 2.

Figure 7 represents a fragmentary sectional view taken on a horizontal plane through the forward end of the vehicle body, showing one form of closure plate that may be used at the light-emitting opening and illustrating the beams projected when the vertical locus is in one position.

Figure 8 is a view similar to Figure 7, illustrating the beam projected when the vertical locus has been shifted to a different position.

Figure 9 is a view similar to Figure 1, illustrating the lowered or depressed beam obtained when the locus is shifted to project the beam through the lenticular portion of a closure plate such as that illustrated in Figure 10.

Figure 10 represents an elevational view of the closure plate illustrated in Figure 9.

Figure 11 illustrates the front elevational view of a modified form of closure plate shown in Figure 12.

Figure 12 represents a vertical sectional view of the closure plate illustrated in Figure 11.

Figure 13 represents a fragmentary horizontal sectional view illustrating another form of closure plate and illustrating the type of beams secured when the locus is in the one position or the other.

Figure 14 represents a view similar to Figure 13, in which a further modification of the closure plate is illustrated, and in which three positions of the locus is illustrated, the type of beams produced when the locus is in the various positions, being indicated.

Figure 15 is an enlarged horizontal sectional view through the type of closure plate illustrated in Figure 14.

Figure 16 represents another modified form of closure plate adapted to be used in connection with the system where three positions of the locus is provided.

Figure 17 represents a view similar to Figure 1, in which a modified form of reflector and lens are used.

Figure 18 represents a rear elevational view of the type of lens shown in Figure 17.

Figures 19 to 23, respectively, represent diagrammatic plan views of the forward end of a vehicle, equipped with the invention, illustrating various typical beams that may be obtained.

Figure 24 represents a fragmentary horizontal sectional view illustrating one form of cover plate which may be used for producing a spread beam.

Figure 25 represents a rear elevational view of the cover plate shown in Figure 24.

Referring more particularly to the drawings, 15 designates a compartment at the forward end of an automobile body, and while this compartment ordinarily contains an engine, not shown, it will be understood that the presence, or the absence of an engine, is immaterial to the practice of this invention. A portion of the body wall of the vehicle is indicated at 16, and this may be the radiator shell. Another portion of the wall of the vehicle, which may be in the form of a hood enclosing the compartment, is indicated at 17, and within this compartment are mounted the reflectors 18 of the driving light projectors. Any convenient method of mounting may be used, for instance, each reflector may be carried by a bracket 19, suspended from a brace rod 20. The outside shell of the vehicle body is provided with light-emitting openings at 21, and these openings, if the vehicle is provided with a radiator shell, may be formed in such shell. The light-emitting openings are preferably made relatively narrow as compared to the diameter of the reflector 18, and their vertical dimensions are greater than their width.

Each of the reflectors 18 is provided with a cover glass or lens 22. The reflectors are located each behind one of the light-emitting openings 21, with its lower edge on a substantially horizontal plane with the lower edge of the light-emitting opening.

The reflectors are paraboloidal in shape and are each provided with a lamp having a filament 23, comprising a light source located at its focal region.

The lenses with which the reflectors are equipped, have each, on one of its faces (the inner face here shown) a series of vertically extended convex cylindrical surfaces 24, symmetrically arranged with reference to the central vertical line of the lens, such surfaces being prismatic in formation with their bases toward the centeral line of the lens. These prismatic formations serve to converge laterally all the issuing rays to cause them to cross in a substantially vertical line 25 (hereinafter referred to as the vertical locus). The opposite face of the lens, beginning somewhat above the central horizontal line, is provided with a series of transversely extending cylindrical surfaces 26, and 27, respectively, in the nature of prismatic surfaces having horizontally extending bases disposed downwardly. The portion of the beam which issues below the prismatic surface 27 is composed of rays lying in substantially horizontal parallel planes, and it will be noted that each of the light openings 21 is substantially equal in height to the vertical dimension of the lower beam portion so that while this portion is fully passed through the opening, an opaque section of the shell of the vehicle is in front of the prismatic portions 26 and 27 of the lens. These prismatic portions serve to refract the upper portions of the beam issuing there through in a downward direction so that the component rays are vertically converged between the lens and the light opening, and merge with the lower portion of the beam at the light opening to pass fully through the latter.

Since the weakest rays are those emerging from points near the lens periphery, I preferably make the horizontal prisms 26 of increasing refractive power as the position of the prisms approaches the upper edge of the lens, so that the uppermost rays which pass through the uppermost prism are directed downward to pass through the lowermost portion of the light opening, as illustrated in Fig. 1, so as to strike the roadway the shortest distance in advance of the vehicle. The rays emitted from the lowermost prism 26 are refracted to a less extent, and pass through the lower medial portion of the light opening, the rays passing through intermediate prisms of the series 26 taking intermediate positions between the most and least refracted rays. In short, the prismatic surfaces 26, being cylindrical on circular arcs, the group of rays $a$ emanating therefrom, converge at a substantially horizontal line at 28 (see Fig. 1). Preferably, although not necessarily, the surface 27 is elliptically curved and the issuing group of rays $b$ passes through the light opening above the rays $a$. Since issuing for the most part from points further removed from the reflector periphery than the rays composing the group $a$, the rays of group $b$ are of the greater strength. The strongest rays of group $b$, which are the bottom issuing rays of this group at the lens, become the top rays beyond the opening 21, and thus carry to the farthest distance. Due to the preferred elliptical curvature of the surface 27, the rays of group $b$ do not converge vertically in a single horizontal line, but in a series of horizontal lines. That is to say, the lowermost rays of group $b$ cross the uppermost rays of such group at a locus farther from the lens than the locus at which intermediate rays of group $b$ cross the uppermost rays.

The vertical spread of groups $a$ and $b$, which together, constitute the top issuing beam at the lens, is such as to substantially fill the light opening 21 from top to bottom, the rays beyond the light opening being higher or lower, in accordance with their strength, the stronger, able to reach the farther, having the smallest angle with the horizontal.

The group of rays forming the lower portion of the beam is designated at $c$, Fig. 1. These rays, as stated above, are in substantially parallel horizontal planes, this terminology being used in order to give the beam a space relation. The rays might more accurately be stated to be parallel to each other, viewed in elevation, since in practice, the reflector and lens will ordinarily be tilted forwardly somewhat so that the lower portion $c$ of the beam will not be exactly horizontal, but will be directed downwardly and forwardly at a slight angle. It will be evident that the upper lens portions 26 and 27 will be substantially invisible from the front of the automobile, due to the mask provided by the shell of the vehicle body.

I have so far described a reflector and lens combination in which the reflector is paraboloidal, the lens being so designed that the required complementary effect is obtained. It should be emphasized that the invention is by no means limited in respect to the type of reflector, and any type of reflector may be used so long as a lens is provided complementary to the reflector to produce the required beam. In order to emphasize this point, I have illustrated in Figures 17 and 18 a lens designed for use with an ellipsoidal reflector, the reflector and lens producing the same beam as described above.

Referring to these figures, the lens 30 on one of its faces is provided on its lower major portion with horizontally extending concave cylindrical prismatic surfaces 31, which act in conjunction with the reflector 18' to produce a group of rays $c'$ substantially identical with the group $c$, of Figure 1. At its top, the lens 30 is provided with horizontally extending convex cylindrical prismatic surfaces 32 which may be elliptically curved, these surfaces serving to deflect downwardly (to a greater degree than the normal deflection produced by the ellipsoidal reflector) the rays passing through these surfaces, these rays crossing to thus produce a group of rays $a'$ similar to the group of rays $a$ of Figure 1. Between the prismatic surfaces 31 and 32, is a plain strip or band 33 which does not materially affect the rays projected therethrough from the ellipsoidal reflector, and which emanate from the latter in portions above its major substantially horizontal axis. This group of rays $b'$, while corresponding in general to the group $b$ of Figure 1, do not cross each other in the manner in which the group of rays $b$ of Figure 1 cross, but converge toward the remote focus of the ellipsoidal reflector, and pass through the light opening near the upper portion of the latter. Such focus is preferably disposed at a suitable distance in advance of the reflector, and behind the light-emitting opening that the rays of the group $c'$, in the lower portion of the beam, which are brought into substantially parallel horizontal planes by the prismatic surfaces 31, are nevertheless, due to the lateral convergence produced by the reflector, caused to cross in a vertical locus 35 containing the remote focus and disposed behind the light opening at the correct distance to allow the emergence of the rays through this opening after crossing at the locus. Thus briefly, a lower horizontal beam portion issues from the lens surfaces 31, and a generally downwardly directed upper beam portion issues from the surfaces 32 and 33, so that a beam substantially of the characteristics of that shown in Figure 1, is produced. Preferably, the light source 34 is located in the focal region of the reflector, so that no vertical converging prisms will be necessary, although it will be understood from the description heretofore given in connection with the reflector and lens combination of Figure 1, that if desired, or necessitated by the particular environment in which the projector is to be used, vertical converging ridges similar to the prismatic surfaces 24 of Figure 2, may be formed on the lens 30, to cause a lateral convergence of the rays issuing from the lens along a vertical locus nearer to the reflector than the locus containing the remote focus of the reflector.

The light-emitting openings 21 are preferably provided with closure plates and the latter, such as the closure plate 36 of Figure 1, may be plain glass.

The invention contemplates, however, the use of closure plates having various lenticular formations to further affect and modify the beam issuing from the reflector and lens combination. For example, it will be understood that the farther the lens and reflector are positioned from the light opening, the sharper the beam must be converged laterally (i. e., the smaller must be the horizontal angle subtended by the beam at the vertical locus), in order to pass it in its entirety through the laterally restricted light-emitting opening. It may thus be desirable to spread the beam somewhat, as it issues through the opening, and this may be done by providing the closure plates with vertically extending concave prismatic ribs 36', such as illustrated in Figures 24 and 25, so that the beam upon emerging from the closure plate is spread horizontally as indicated by the emerging rays 37, so as to form a beam such as indicated at 38 in Figure 21, which is spread to a greater extent than would be the case were the closure plate made of plain glass.

The invention further contemplates, as heretofore referred to, a construction and arrangement of parts whereby the characteristics of the beams may at will be changed to suit the driving conditions of the moment. For instance, the beam may be modified at will to provide a long range driving beam, a lowered or depressed beam, or a beam which may be used in passing other vehicles, or in turning corners.

To this end I provide a system whereby the beam from each light projector may be shifted horizontally and passed through different sections of the closure plate and modified in characteristics in accordance with the optical elements on the particular section of the closure plate through which it is passed.

Referring more particularly to Figures 7 and 8, it will be seen that I provide each of the lamps with which the reflectors are equipped, with a filament 40 comprising a secondary light source, spaced horizontally to one side of the filament 23, the filament 40 of the left hand lamp being placed for instance, to the left of the filament 23 thereof, and the filament 40 of the right hand lamp being placed to the right of the filament 23 thereof. I also provide, though it is not shown, as it is well understood in the art, means whereby the one filament or the other may be lighted at will, the arrangement being such that when the filaments 23 are lighted, the filaments 40 are extinguished and vice versa, or both filaments may be lighted at once. I preferably so position the secondary light sources 40 that upon extinguishment of the light sources 23 and the illumination of the light sources 40, a lateral shifting of the beams from the light projectors takes place sufficient to move the vertical loci 25 from the positions they occupy when the light sources 23 are active, to positions such as indicated at 25' in Figures 7 and and 8, so that the beams, instead of passing through the outside halves of the closure plates when the light sources 23 are active, as illustrated in Figure 7, will be shifted inwardly and passed through the inside halves of the closure plates, as illustrated in Figure 8. Sufficient movement of each of the beams is accomplished when it has been shifted the width of its cross section at the closure plate, and as this cross section is relatively narrow, a relatively small lateral movement of the beam will be sufficient to project it through an area of the closure plate alongside the area occupied by the beam before it is shifted. Hence, the supplemental light sources are located a relatively short distance to the sides of the true focal regions of the reflectors. While these supplemental light sources 40 are somewhat out of the true foci of the reflectors, due to the fact that only a relatively small shifting of the beams is necessary, the beams, while being somewhat diffused by the non-focal location of the supplemental light sources, still sufficiently retain their characteristics and definition to be accurately projected through predetermined areas of the closure plates.

The various areas of the closure plates through which the beams are projected, may have different optical characteristics. For instance, in Figures 7 and 8, the outer halves g of the closure plates, through which the beams are projected when the light sources 23 are active, may be plain glass, and the beams allowed to pass therethrough unmodified, in order to provide normal long range driving beams, as illustrated at 41, in Figure 19. The inner halves h, of the closure plates in these figures, are provided with vertically extending concave flutes or prisms 42, which, when the beams have been shifted to pass through them will diffuse and spread the rays, as indicated at 43, in Figure 8, in order to soften the beams and spread them over a wider area in the manner of the beams illustrated in Figure 21.

As illustrated in Figures 9 and 10, I may, in place of the flutes 42, equip the areas of the cover plates occupied by such flutes with horizontally arranged prisms 44 placed with their bases downward, so that when the beams are shifted to pass through these prisms, the rays will be refracted downwardly to strike the roadway nearer to the car than before, as illustrated by the rays 45, to thus provide a lowered or depressed beam as indicated at 46, Figure 20. I may also, if desired, provide the opposite surfaces of the areas covered by the lenses 44 with vertically arranged convex flutes 47, (Figs. 11 and 12) in order to effect a spreading and diffusion of the beams at the same time that they are lowered.

It will be understood that I may, if desired, so control the light sources that the secondary light source for one projector is active at the same time that the primary light source for the other projector is active. As an illustration of the effect that can be obtained, I have shown in Figure 22, a beam combination 48 which may be used for passing, instead of the totally lowered beams of Figure 20. The beam combination of Figure 22 will be produced, for instance, where cover plates such as those illustrated in Figures 9 and 10 are used, when the beam from the primary light source of the right hand projector is active and the beam therefrom extends to the distance as illustrated at 49, while the secondary light source of the left hand projector is active, so that the left beam is shifted to pass through the prisms 44 of the left hand cover plate, and thus become depressed, as at 50, Fig. 22. The composite beam thus produced reaches only to a relatively short distance on the left hand part of the roadway, but reaches to a longer distance on the right hand part of the roadway.

I have shown a further modification of the cover glasses in Figure 13, in which the outer halves of the cover glasses are made in the form of vertically extending double concave lenses 51, with their bases disposed outwardly, and which are of increasing refractive power as their outer edges are approached, the inner halves of the cover plates being plain, for instance, as at 52. This construction may be used when it is desired to provide beams which may be shifted very much to the left or to the right to provide illumination, for instance, for turning corners. If, with such cover plates the primary light source 23 of the left hand projector is active so that the rays therefrom pass through the plain portion 52 of the cover plate, as indicated by the rays 53 shown in full lines, at the same time that the secondary light source 40 of the right hand projector is active, so as to shift the beam and project it through the lens 51 of the right hand cover glass, also as shown by the full line rays 53', the action of the right hand lens 51 will very much spread the rays passing therethrough and project them at increasing angles to the right as the outer edge of the cover plate is reached, so that a composite beam 54, 55 such as that shown in Figure 23, will be produced. In this, while the beam 54 from the left hand projector extends normally to the distance, the beam 55 from the right hand projector is deflected to and spread outwardly toward the right so as to illuminate a corner or turn in the road on the right hand side. If the order of illumination of the light sources is reversed so that the left hand secondary filament is active at the same time that the primary right hand filament is active, the beams will be shifted to occupy the positions indicated by the dotted line rays 56 of Figure 13, in which event, the rays from the right hand reflector pass straight ahead through the plain portion 52 of the right hand cover plate to project normally to the distance, while the rays from the left hand projector pass through the prismatic portion 51 of the left hand cover plate, and are deflected to the left, also as illustrated by the dotted line rays 56', so as to spread out the beam for a left hand turn.

A further modification of the system is illustrated in Figures 14 and 15, in which each lamp is provided with three light sources, and in which the closure plates are provided with three areas having different optical characteristics. The primary light sources 23' are illustrated as occupying the focal regions of the reflectors, and the beams from such light sources pass through the plane central portions 57 of the cover plates, and pass out normally to provide the long range driving beam as indicated by the full line rays 58. When the secondary light sources 40' are active, the beams will be shifted laterally inwardly toward each other to pass through the inner vertically fluted portions 59 of the cover plates, and thus become diffused and spread laterally, as indicated by the dotted line rays 60, so as to provide spread beams. When the third light sources 61, shown as disposed on the opposite sides of the primary light sources 23 from the secondary light sources 40' are active, the beams will be shifted outwardly away from each other, beyond their normal position, so as to project through the outside areas 62 of the closure plates. These areas are illustrated as being formed with a series of vertically extending substantially triangular prisms 63 arranged with their bases outwardly, so that the beams passing therethrough, will be spread to left and right, respectively, as illustrated by the broken line rays 64, to thus broaden the illuminated areas of the roadway, and thus provide convenient beams for use in rounding sharp curves or turning corners. From what has heretofore been said, it will be understood that the order in which the various light sources are activated, may be changed, so as to provide composite beams of varying characteristics.

It will be understood that the cover plates do not need to be of a generally plane shape, but may be varied in shape to adapt themselves to various designs of automobile bodies. As one illustration of this, I have shown in Figure 16, a modification of a left hand cover plate, in which the outer portion 65 is curved and is provided with a series of vertically extending prisms 66 disposed with their bases outwardly and having curved faces, for laterally distributing the rays when the beam is shifted to pass therethrough, as indicated by the rays 67, somewhat in the manner of the rays 64 of Fig. 14. The central portion of this cover plate is formed with a series of vertically extending concaved zones 68 symmetrically arranged with respect to the central portion of this section of the cover plate, so as to spread the rays to right and left, as indicated by the rays 69, when the beam is shifted to pass through this portion of the plate. The inner section of the plate may be left plain, so that when the beam is shifted to pass therethrough, the rays will extend forwardly in the normal manner, as indicated by the rays 70.

From the foregoing it will be evident that the light projecting means described, is well adapted for use in connection with automotive vehicles. While I have illustrated the light-emitting openings as being located in the shell or walls of the vehicle body alongside the radiator, it will be understood that various modifications and changes in the location of the light-emitting openings may be made, to adapt the invention to various designs of automobile bodies.

Preferably, the light rays passing through the compartment 15 are exposed so that any mechanism in the compartment is illuminated, and the making of repairs thus facilitated. Further, where the side walls of the compartment are provided with openings, such for example as illustrated at 71 (Fig. 1), the light of the beams and the illumination within the compartment is visible, so that the car may thus be readily seen from what has heretofore been substantially blind angles. Further, should the light sources of one of the light projectors fail, light from the other projector, for instance, direct rays from the active light source thereof, will illuminate to some extent the light-emitting opening of the extinguished projector, so that no blind effect on that side will occur.

While the foregoing detailed description has been given for purposes of illustration of the invention, it will be understood that no undue limitations should be deduced therefrom, but that variations in the construction, combination and arrangement of parts, and the uses to which the invention may be put, may be made within the range of equivalents to which the invention is entitled, without departing from the scope of the claims.

Having thus described my invention what I claim as new, and desire to secure by U. S. Letters Patent is,—

1. A system of light distribution control comprising a beam generating unit including a reflector having the surface of a body of revolution of a conic section and having an optical axis and a focal point, an electric light bulb having a filament at said focal point, and a lens closure for said reflector provided with prismatic formations, said reflector and lens closure being complementary to project a beam whose rays are laterally converged at an acute angle and crossed to form a locus in the plane of said optical axis in front of and at a distance from said lens closure; a light distributing unit disposed in the path of said beam and in the proximity of said locus, said distributing unit comprising a glass plate having sections of different optical characteristics, said bulb having a plurality of other filaments so spaced and so controllable that the beam is movable to shift the locus thereof whereby to pass the beam through different portions of said glass plate, the character of the beam beyond said glass plate being thereby modified.

2. In a headlight device an optical system comprising two units independent from each other in their construction and functions, the first unit constituting beam forming means and comprising a concave reflector having a surface of a body of revolution of a conic section, said reflector having a horizontal optical axis and a source of light in the focal region of said reflector, said reflector projecting a beam of light symmetrical with respect to said optical axis, a glass plate in front of said reflector of sufficient size to pass all of said beam, said glass plate being equipped with vertical and horizontal refracting cylindrical components of such refracting power and whose surfaces are at such refracting angles as to convert said symmetrical beam into a double astigmatic beam comprising upper and lower portions, said lower beam portion consisting of a series of laterally converging horizontal strata forming a locus of foci on a vertical line in the plane containing said optical axis in front of said reflector and at a distance beyond said glass plate, said distance being sufficiently great to permit lateral crossing of all the rays at acute angles at said locus, said upper beam portion consisting of laterally converging strata forming a locus of foci on a vertical line in the plane containing said optical axis and at the same distance from said glass plate as the locus of the lower beam portion, the strata of said upper beam portion vertically converging and forming a horizontal locus in space between said vertical locus and said glass plate and in the plane of the upper stratum of said lower beam portion, whereby the respective vertical loci of the upper and lower beam portions are superimposed and merged into a common locus of very small width and of a height substantially equal to that of the lower beam portion; the second unit constituting multiple light distributing means and comprising a second glass plate divided into sections of different optical characteristics, and positioned in the path of said beam and in proximity of said common locus, each of said sections being of a size sufficient to pass said beam and being equipped with prismatic formations whereby, by passing said beam through any one of said sections, the character of the beam beyond said plate is correspondingly modified, and means whereby said common locus may be shifted laterally, so that the beam is caused to pass through any one of the different sections of said second glass plate.

3. Apparatus according to claim 2, wherein the reflector is paraboloidal in shape, the glass plate in front of the reflector serves as a closure for the latter, said glass plate being provided with a series of convex vertical cylindrical refracting elements having a common focal length equal to the distance between said glass plate and the vertical locus, upper portion of said plate being provided with a series of convex horizontal cylindrical refracting elements whose focal lengths vary from that of said vertical elements to substantially one-half of the same, said horizontal elements terminating somewhat above the optical axis of the reflector, whereby the central zone of the projected beam is included into the series of horizontal strata forming the lower beam portion.

4. Apparatus according to claim 2, wherein the reflector is in shape of a portion of an ellipsoid of revolution with the source of light located at the proximate focus of the latter and whose major axis is equal to the distance from the source of light to the vertical locus, and wherein the glass plate in front of the reflector serves as a closure for the latter, said glass plate being provided with a series of horizontal cylindrical refracting elements, concave in the lower portion of the plate and convex in its upper portion, and whose vertical refracting elements degenerated into parallel surfaces, the focal length of said concave elements being equal to the distance between said glass plate and the vertical locus, the focal lengths of said convex elements varying from infinity to substantially that of the concave elements, said concave elements extending somewhat above the optical axis of the reflector, whereby the central zone of the projected beam is included into the series of horizontal strata forming the lower beam portion.

5. A system of light distribution control comprising a beam generating unit including a reflector having the surface of a portion of a body of revolution of a conic section and having an optical axis and a focal point, light emitting means in the focal region of said reflector, said means being controllable to selectively emit light at the focal point of said reflector and at positions adjacent thereto, a lens closure for said reflector provided with prismoidal formations, said reflector and lens closure being complementary to project a beam whose rays are converged at an acute angle and crossed to form a locus normally in the plane of said optical axis in front of and at a distance from said lens closure; a light distributing unit disposed in the path of said beam and in proximity of said locus, said distributing unit comprising a glass plate having sections of different optical characteristics, whereby, by causing said light emitting means to change the locality of light emission, said locus is caused to shift from its normal position on said optical axis to positions adjacent thereto so that said beam is caused to pass through different sections of said glass plate whereby the character of the beam beyond said glass plate is modified.

6. Apparatus according to claim 5, wherein the locus lies in a vertical plane and the light distributing unit comprises a glass plate divided into vertical sections of different optical characteristics, each of said sections being of a size sufficient to pass the entire beam.

7. An illuminating system comprising a beam generating unit including a reflector having a surface of a portion of a body of revolution of a conic section and having a focal point, a source of light comprising a plurality of spaced, selectively or simultaneously energizable incandescent filaments in the focal region of said reflector, and a glass closure for said reflector provided with prismoidal formations; said reflector and lens closure being complementary, when a plurality of said filaments are energized, to project simultaneously a plurality of beams whose rays are converged at acute angles and crossed to form a plurality of loci lying in closely adjacent parallel planes in front of and at a distance from said glass closure; a light distributing unit comprising a glass plate divided into sections of different optical characteristics, said distributing unit being disposed in the proximity of said loci in such a manner that each of the projected beams will pass through a different section of said glass plate whereby a plurality of beams of different characteristics are simultaneously produced beyond said glass plate.

GEORGE KUHN.